United States Patent
Pan et al.

(10) Patent No.: US 11,196,053 B2
(45) Date of Patent: Dec. 7, 2021

(54) SOLID OXIDE FUEL CELLS WITH CATHODE FUNCTIONAL LAYERS

(71) Applicants: Ke-Ji Pan, Ellicott City, MD (US); Mohammed Hussain Abdul Jabbar, College Park, MD (US); Dong Ding, Idaho Falls, ID (US); Eric Wachsman, Fulton, MD (US)

(72) Inventors: Ke-Ji Pan, Ellicott City, MD (US); Mohammed Hussain Abdul Jabbar, College Park, MD (US); Dong Ding, Idaho Falls, ID (US); Eric Wachsman, Fulton, MD (US)

(73) Assignees: REDOX POWER SYSTEMS, LLC, College Park, MD (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 16/572,938

(22) Filed: Sep. 17, 2019

(65) Prior Publication Data
US 2020/0099060 A1    Mar. 26, 2020

Related U.S. Application Data

(63) Continuation of application No. 15/461,708, filed on Mar. 17, 2017, now Pat. No. 10,461,335.
(Continued)

(51) Int. Cl.
| | | |
|---|---|---|
| *H01M 4/00* | (2006.01) | |
| *H01M 4/86* | (2006.01) | |
| *H01M 8/1213* | (2016.01) | |
| *H01M 4/90* | (2006.01) | |
| *H01M 8/1253* | (2016.01) | |
| *H01M 8/126* | (2016.01) | |
| *H01M 8/1246* | (2016.01) | |

(Continued)

(52) U.S. Cl.
CPC ....... *H01M 4/8663* (2013.01); *H01M 4/9033* (2013.01); *H01M 4/9066* (2013.01); *H01M 8/126* (2013.01); *H01M 8/1213* (2013.01); *H01M 8/1246* (2013.01); *H01M 8/1253* (2013.01); *B05D 3/0254* (2013.01); *B05D 7/50* (2013.01); *H01M 2008/1293* (2013.01); *H01M 2250/30* (2013.01); *Y02E 60/50* (2013.01); *Y02P 70/50* (2015.11)

(58) Field of Classification Search
CPC ....... H01M 2008/1293; H01M 8/1246; H01M 2250/30; H01M 4/9066; H01M 8/126; H01M 4/9033; Y02P 70/56; Y02E 60/525
See application file for complete search history.

(56) References Cited

U.S. PATENT DOCUMENTS

| | | |
|---|---|---|
| 5,403,461 A | 4/1995 | Tuller et al. |
| 5,418,081 A | 5/1995 | Kawasaki et al. |

(Continued)

OTHER PUBLICATIONS

International Search Report, for International Application No. PCT/US2017/022884, dated Jul. 11, 2017, 12 pages.

*Primary Examiner* — Cynthia H Kelly
*Assistant Examiner* — Monique M Wills
(74) *Attorney, Agent, or Firm* — Morgan, Lewis & Bockius LLP (57) ABSTRACT

In various embodiments, a solid oxide fuel cell features a functional layer for reducing interfacial resistance between the cathode and the solid electrolyte.

29 Claims, 8 Drawing Sheets

Related U.S. Application Data

(60) Provisional application No. 62/310,358, filed on Mar. 18, 2016.

(51) Int. Cl.
    *B05D 7/00*     (2006.01)
    *B05D 3/02*     (2006.01)
    *H01M 8/124*     (2016.01)

(56) References Cited

U.S. PATENT DOCUMENTS

| | | |
|---|---|---|
| 5,527,633 A * | 6/1996 | Kawasaki ............. H01M 8/124 |
| | | 429/496 |
| 10,186,710 B2 | 1/2019 | Pan et al. |
| 2006/0166070 A1 | 7/2006 | Hickey et al. |
| 2008/0248395 A1 | 10/2008 | Harada et al. |
| 2009/0148743 A1 | 6/2009 | Day et al. |
| 2010/0167170 A1 | 7/2010 | Narendar et al. |
| 2011/0039183 A1 | 2/2011 | Armstrong et al. |
| 2013/0004881 A1 | 1/2013 | Shaigan et al. |
| 2013/0052562 A1 | 2/2013 | Yoon |
| 2013/0154147 A1 * | 6/2013 | Mohanram ......... H01M 8/1246 |
| | | 264/49 |
| 2013/0224628 A1 * | 8/2013 | Moon ................... C04B 35/486 |
| | | 429/489 |
| 2017/0271683 A1 | 9/2017 | Pan et al. |
| 2017/0271700 A1 | 9/2017 | Pan et al. |
| 2019/0148738 A1 | 5/2019 | Pan et al. |

* cited by examiner

SOLID OXIDE FUEL CELLS WITH CATHODE FUNCTIONAL LAYERS

RELATED APPLICATION

This application is a continuation of U.S. patent application Ser. No. 15/461,708, filed Mar. 17, 2017, which claims the benefit of and priority to U.S. Provisional Patent Application No. 62/310,358, filed Mar. 18, 2016, the entire disclosure of each of which is hereby incorporated herein by reference.

GOVERNMENT SUPPORT

This invention was made with United States Government support under Contract No. DEAR0000494 awarded by the Department of Energy Advanced Projects Research Agency-Energy (ARPA-E). The United States Government has certain rights in the invention.

TECHNICAL FIELD

In various embodiments, the present invention relates to solid oxide fuel cells, and in particular to solid oxide fuel cells with cathode-side functional interlayers.

BACKGROUND

Solid oxide fuel cells (SOFCs) are highly efficient, environmentally friendly electrochemical devices that are capable of directly converting chemical energy stored in hydrogen or hydrocarbon fuels into electrical energy. During SOFC operation, oxygen ions migrate from a cathode to an anode through a dense electrolyte. At the anode, the oxygen ions oxidize the fuel, resulting in the generation of electrons that may be directed through an external circuit. SOFCs may be used for, for example, off-grid and portable power generation.

Although SOFCs have many advantages over other types of fuel cells, many conventional SOFCs operate at high temperatures (e.g., 800° C. or above), which can lead to degradation of the cell components, longer startup times, and high maintenance costs. While lower-temperature operation would address many of these issues, operation at lower temperatures also presents operational challenges. For example, internal losses within the electrolyte and cathode resistance are typically higher during operation at lower temperature. Thus, there is a need for SOFC structures that have improved performance during low-temperature operation.

SUMMARY

In accordance with various embodiments of the present invention, SOFCs incorporate thin functional layers between the electrolyte and the cathode in order to reduce the interfacial resistance between the electrolyte and the cathode. While not wishing to be bound by any particular theory of operation, the present inventors believe that functional layers in accordance with embodiments of the present invention enhance the bonding and/or adhesion at the interface between the cathode and the solid electrolyte, thereby expediting oxygen ion transport within the SOFC. Exemplary functional layers in accordance with embodiments of the invention include cobalt-doped gadolinium-doped ceria (Co-GDC, for example, Co—$Ce_{0.9}Gd_{0.1}O_{1.95}$) and cobalt-doped samarium doped ceria (Co-SDC, for example, Co—$Ce_{0.8}Sm_{0.2}O_{1.9}$). The functional layer may be disposed and in direct contact with the solid electrolyte and the cathode material, and the functional layer may be fabricating utilizing, for example, wet chemical or solid-state techniques.

Functional layers in accordance with embodiments of the present invention may also provide one or more additional advantages for SOFC operation. For example, various functional layers (e.g., Co-GDC) have high ionic transference numbers (i.e., fractions of their total current carrying capability carried via ionic transport), and thus may be utilized to retard, block, or substantially minimize electronic conduction in the SOFC when utilized with mixed-conducting electrolytes (i.e., electrolytes that are both ionic and electronic conductors) such as GDC. This reduction in electronic conduction may advantageously improve, for example, the open-circuit voltage of the SOFC.

Furthermore, functional layers in accordance with embodiments of the invention may have high oxygen exchange coefficients, thereby enabling faster surface oxygen adsorption and desorption, and thus faster oxygen lattice incorporation. Thus, the functional layer may enhance mass transport at the interface between the cathode and the electrolyte, reducing interfacial resistance to oxygen introduction into the electrolyte, increasing SOFC performance, and decreasing the area-specific resistance of the SOFC. Moreover, the increased oxygen exchange coefficients of functional layers in accordance with embodiments of the invention advantageously enable lower-temperature SOFC operation. For example, oxygen surface exchange within various functional layers may occur at temperatures as low as approximately 400° C., enabling SOFC operation at temperatures ranging from, for example approximately 400° C. to approximately 750° C., or even approximately 400° C. to approximately 550° C. In accordance with various embodiments of the invention, high oxygen surface coefficients are enabled by the agglomeration or redistribution of one or more elements of the functional layer (e.g., a dopant such as Co) toward or at grain boundaries in the functional layer, thereby forming dopant-rich phases within the functional layer.

In addition, constituent elements and/or species within various functional layers in accordance with embodiments of the invention act as sintering agents that enable increased densification of the functional layer at lower temperatures. For example, Co-GDC may be densified at temperatures as low as 900° C., while GDC requires temperatures of approximately 1400° C. for densification. The ability to densify functional layers at lower temperatures maintains a greater variety of materials compatibility options with regard to other materials within the SOFC (e.g., with cathode and electrode materials for chemical compatibility to avoid materials reactions between layers) and may also help to minimize thermal-mismatch issues resulting from different coefficients of thermal expansion between layers (i.e., stresses than may arise during temperature cycling during, e.g., fabrication and/or operation, due to differential contraction and/or expansion). The use of high-density functional layers may also minimize or reduce ohmic losses that might arise due to the use of porous or poorly sintered layers. Finally, the ability to sinter functional layers in accordance with embodiments of the invention at lower temperatures may also prevent or reduce diffusion of various elements from the functional layer (e.g., Co or other metals) into the electrolyte of the SOFC, thereby maintaining higher performance of the SOFC. In fact, various embodiments of the invention feature SOFCs with multilayer electrolytes, in which the concentration of a mobile species (e.g., a metal such as Co) within a first layer of the electrolyte (where the first electrolyte is closer to the cathode) is higher than that within a second layer of the electrolyte (where the second electrolyte is closer to the anode), where the first layer of the electrolyte is adjacent to the functional layer. In such SOFCs, the concentration of the mobile species is higher still (i.e., higher than in any layer of the electrolyte) within the functional layer. Such structures may advantageously resist interdiffusion of the mobile species and thereby maintain high SOFC performance.

In an aspect, embodiments of the invention feature a solid oxide fuel cell that includes, consists essentially of, or consists of a cathode, a solid electrolyte, an anode, and a functional layer. The solid electrolyte conducts oxygen ions from the cathode to the anode. At the anode, the oxygen ions react with a hydrogen-containing fuel to generate electricity. The functional layer is disposed between the cathode and the solid electrolyte. The functional layer reduces interfacial resistance (to, e.g., ionic conduction) between the cathode and the solid electrolyte.

Embodiments of the invention may include one or more of the following in any of a variety of combinations. The functional layer may be disposed in direct contact with the cathode and/or with the solid electrolyte. The functional layer may include, consist essentially of, or consist of cobalt-doped gadolinium-doped ceria and/or cobalt-doped samarium-doped ceria. The cathode may include, consist essentially of, or consist of lanthanum strontium cobalt ferrite, lanthanum strontium manganite, lanthanum strontium cobaltite, barium strontium cobalt ferrite, samarium strontium cobaltite, samarium-doped ceria, and/or gadolinium-doped ceria. The solid electrolyte may include, consist essentially of, or consist of yttria-stabilized zirconia, scandia-stabilized zirconia, lanthanum strontium magnesium gallate, samarium-doped ceria, and/or gadolinium-doped ceria. The anode may include, consist essentially of, or consist of a composite that includes, consists essentially of, or consists of one or more metals (e.g., nickel) and/or one or more metal oxides (e.g., nickel oxide) and a material of the solid electrolyte (e.g., gadolinium-doped ceria). The anode may include, consist essentially of, or consist of a composite that includes, consists essentially of, or consists of one or more metals (e.g., nickel) and/or one or more metal oxides (e.g., nickel oxide) and yttria-stabilized zirconia. The thickness of the functional layer may range from approximately 0.1 µm to approximately 20 µm, from approximately 0.5 µm to approximately 15 µm, from approximately 1 µm to approximately 12 µm, from approximately 1 µm to approximately 10 µm, or from approximately 1 µm to approximately 6 µm. The hydrogen-containing fuel may include, consist essentially of, or consist of hydrogen and/or a hydrocarbon. The functional layer may contain one or more metals or other dopants (e.g., cobalt, samarium, etc.) at a composition ranging from approximately 0.1 mol % to approximately 10 mol %, from approximately 0.2 mol % to approximately 8 mol %, or from approximately 0.5 mol % to approximately 5 mol %. The functional layer and at least a portion of the solid electrolyte (e.g., one or more layers of an electrolyte composed of multiple layers, or a portion of a single-layer electrolyte) may both contain one or more metals or other dopants (e.g., cobalt, samarium, etc.). The concentration of at least one said metal or other dopant (e.g., cobalt, samarium, etc.) within the at least a portion of the solid electrolyte may be less than the concentration within the functional layer. One or more layers of the solid electrolyte may have a concentration of at least one said metal or other dopant (e.g., cobalt, samarium, etc.) greater than that within one or more other portions or layers of the solid electrolyte and/or less than that within the functional layer.

In another aspect, embodiments of the invention feature a method of electrochemically converting a hydrogen-containing fuel to electricity using a solid oxide fuel cell that includes, consists essentially of, or consists of (i) a cathode, (ii) an anode, (iii) a solid electrolyte disposed between the anode and the cathode, and (iv) a functional layer disposed between the cathode and the solid electrolyte. Oxygen or an oxygen-containing gas is ionized at the cathode, thereby producing oxygen ions. The oxygen ions are conducted from the cathode to the anode, through the solid electrolyte, whereby the functional layer reduces interfacial resistance between the cathode and the solid electrolyte. The oxygen ions are reacted with the fuel at the anode, thereby generating electricity.

Embodiments of the invention may include one or more of the following in any of a variety of combinations. The functional layer may be disposed in direct contact with the cathode and/or with the solid electrolyte. The functional layer may include, consist essentially of, or consist of cobalt-doped gadolinium-doped ceria and/or cobalt-doped samarium-doped ceria. The cathode may include, consist essentially of, or consist of lanthanum strontium cobalt ferrite, lanthanum strontium manganite, lanthanum strontium cobaltite, barium strontium cobalt ferrite, samarium strontium cobaltite, samarium-doped ceria, and/or gadolinium-doped ceria. The solid electrolyte may include, consist essentially of, or consist of yttria-stabilized zirconia, scandia-stabilized zirconia, lanthanum strontium magnesium gallate, samarium-doped ceria, and/or gadolinium-doped ceria. The anode may include, consist essentially of, or consist of a composite that includes, consists essentially of, or consists of one or more metals (e.g., nickel) and/or one or more metal oxides (e.g., nickel oxide) and a material of the solid electrolyte (e.g., gadolinium-doped ceria). The anode may include, consist essentially of, or consist of a composite that includes, consists essentially of, or consists of one or more metals (e.g., nickel) and/or one or more metal oxides (e.g., nickel oxide) and yttria-stabilized zirconia. The thickness of the functional layer may range from approximately 0.1 µm to approximately 20 µm, from approximately 0.5 µm to approximately 15 µm, from approximately 1 µm to approximately 12 µm, from approximately 1 µm to approximately 10 µm, or from approximately 1 µm to approximately 6 µm. The hydrogen-containing fuel may include, consist essentially of, or consist of hydrogen and/or a hydrocarbon. The functional layer may contain one or more metals or other dopants (e.g., cobalt, samarium, etc.) at a composition ranging from approximately 0.1 mol % to approximately 10 mol %, from approximately 0.2 mol % to approximately 8 mol %, or from approximately 0.5 mol % to approximately 5 mol %. The functional layer and at least a portion of the solid electrolyte (e.g., one or more layers of an electrolyte composed of multiple layers, or a portion of a single-layer electrolyte) may both contain one or more metals or other dopants (e.g., cobalt, samarium, etc.). The concentration of at least one said metal or other dopant (e.g., cobalt, samarium, etc.) within the at least a portion of the solid electrolyte may be less than the concentration within the functional layer. One or more layers of the solid electrolyte may have a concentration of at least one said metal or other dopant (e.g., cobalt, samarium, etc.) greater than that within one or more other portions or layers of the solid electrolyte and/or less than that within the functional layer. The oxygen ions may be reacted with the fuel at a temperature ranging from approximately 300° C. to approximately 800° C., from approximately 350° C. to approximately 750° C., from approximately 400° C. to approximately 750° C., from approximately 400° C. to approximately 700° C., from approximately 450° C. to approximately 650° C., from approximately 450° C. to approximately 600° C., or from approximately 500° C. to approximately 650° C.

In yet another aspect, embodiments of the invention feature a method of fabricating a solid oxide fuel cell. An anode layer is provided. A solid electrolyte layer is disposed over the anode layer. A functional layer is disposed (e.g., deposited) over the solid electrolyte layer. A cathode layer is disposed over the functional layer, thereby forming the solid oxide fuel cell.

Embodiments of the invention may include one or more of the following in any of a variety of combinations. The functional layer may be disposed in direct contact with the cathode layer and/or with the solid electrolyte layer. The functional layer may include, consist essentially of, or consist of cobalt-doped gadolinium-doped ceria and/or cobalt-doped samarium-doped ceria. The cathode layer may include, consist essentially of, or consist of lanthanum strontium cobalt ferrite, lanthanum strontium manganite, lanthanum strontium cobaltite, barium strontium cobalt ferrite, samarium strontium cobaltite, samarium-doped ceria, and/or gadolinium-doped ceria. The solid electrolyte layer may include, consist essentially of, or consist of yttria-stabilized zirconia, scandia-stabilized zirconia, lanthanum strontium magnesium gallate, samarium-doped ceria, and/or gadolinium-doped ceria. The anode layer may include, consist essentially of, or consist of a composite that includes, consists essentially of, or consists of one or more metals (e.g., nickel) and/or one or more metal oxides (e.g., nickel oxide) and a material of the solid electrolyte (e.g., gadolinium-doped ceria). The anode layer may include, consist essentially of, or consist of a composite that includes, consists essentially of, or consists of one or more metals (e.g., nickel) and/or one or more metal oxides (e.g., nickel oxide) and yttria-stabilized zirconia. The thickness of the functional layer may range from approximately 0.1 µm to approximately 20 µm, from approximately 0.5 µm to approximately 15 µm, from approximately 1 µm to approximately 12 µm, from approximately 1 µm to approximately 10 µm, or from approximately 1 µm to approximately 6 µm. The hydrogen-containing fuel may include, consist essentially of, or consist of hydrogen and/or a hydrocarbon. The functional layer may contain one or more metals or other dopants (e.g., cobalt, samarium, etc.) at a composition ranging from approximately 0.1 mol % to approximately 10 mol %, from approximately 0.2 mol % to approximately 8 mol %, or from approximately 0.5 mol % to approximately 5 mol %. The functional layer and at least a portion of the solid electrolyte layer (e.g., one or more layers of an electrolyte layer composed of multiple layers, or a portion of a single-layer electrolyte layer) may both contain one or more metals or other dopants (e.g., cobalt, samarium, etc.). The concentration of at least one said metal or other dopant (e.g., cobalt, samarium, etc.) within the at least a portion of the solid electrolyte layer may be less than the concentration within the functional layer. One or more layers of the solid electrolyte layer may have a concentration of at least one said metal or other dopant (e.g., cobalt, samarium, etc.) greater than that within one or more other portions or layers of the solid electrolyte layer and/or less than that within the functional layer.

The solid electrolyte layer may be disposed over the anode layer before the functional layer is deposited. The anode layer and/or the solid electrolyte layer may be provided by tape casting. Disposing the solid electrolyte layer over the anode layer may include, consist essentially of, or consist of laminating the solid electrolyte layer to the anode layer (by, e.g., hot pressing and/or cold pressing). The solid electrolyte may be provided or formed before the solid electrolyte layer is disposed over the anode layer. The solid oxide fuel cell may be annealed after the cathode layer is disposed over the functional layer. At least a portion of the solid oxide fuel cell (e.g., the anode layer and the solid electrolyte layer; the anode layer, the solid electrolyte layer, and the functional layer; or the anode layer, the solid electrolyte layer, the functional layer, and the cathode layer) may be annealed after the solid electrolyte layer is disposed over the anode layer. The functional layer and the cathode layer may be annealed together (e.g., co-fired) after the cathode layer is disposed over the functional layer. The solid oxide fuel cell may be annealed at a temperature ranging from approximately 600° C. to approximately 1300° C., from approximately 650° C. to approximately 1250° C., from approximately 700° C. to approximately 1200° C., from approximately 750° C. to approximately 1150° C., from approximately 800° C. to approximately 1100° C., from approximately 850° C. to approximately 1050° C., from approximately 900° C. to approximately 1000° C., or from approximately 900° C. to approximately 950° C. The solid oxide fuel cell may be annealed at a temperature no greater than approximately 1100° C., no greater than approximately 1050° C., no greater than approximately 1000° C., or no greater than approximately 950° C. The solid oxide fuel cell may be annealed at a temperature no less than approximately 800° C., no less than approximately 850° C., or no less than approximately 900° C. The solid oxide fuel cell may be annealed for a time period ranging from approximately 0.3 hour to approximately 10 hours, from approximately 0.4 hour to approximately 8 hours, from approximately 0.5 hour to approximately 5 hours, or from approximately 1 hour to approximately 4 hours. The solid oxide fuel cell may be annealed for a time period no greater than 20 hours. The solid oxide fuel cell may be annealed for a time period no greater than 10 hours. The solid oxide fuel cell may be annealed for a time period no less than 0.5 hours. The solid oxide fuel cell may be annealed for a time period no less than 1 hour. The thickness of the functional layer may be selected based at least in part on an intended temperature of operation (e.g., the temperature of the fuel and/or of the solid oxide fuel cell itself) of the solid oxide fuel cell.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
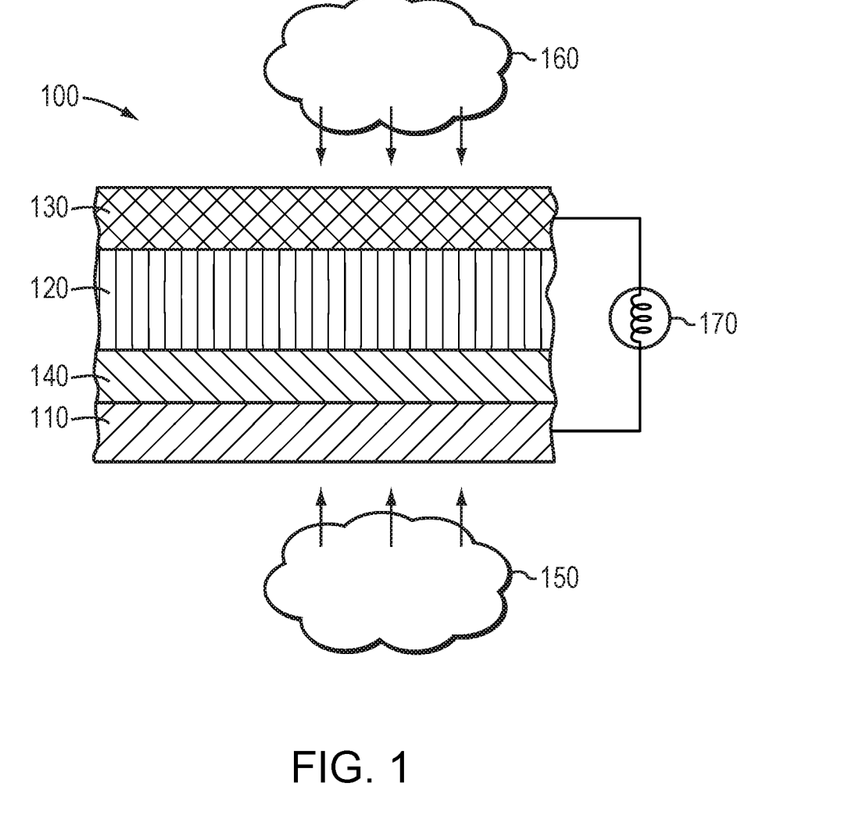
FIG. 1 is a schematic diagram of solid oxide fuel cell incorporating a functional layer in accordance with various embodiments of the invention.

FIG. 1 schematically depicts a SOFC 100 in accordance with embodiments of the present invention. As shown, the SOFC 100 features a cathode 110, a solid electrolyte 120, an anode 130, and a functional layer 140. During operation of SOFC 100, oxygen from an oxygen source 150 (e.g., air) is ionized by the cathode 110. The resulting oxygen ions are conducted from the cathode 110, through the solid electrolyte 120, to the anode 130. At the anode 130, the oxygen ions are reacted with a hydrogen-containing fuel 160 to produce electricity. As shown, the generated electricity may be flowed through an external load 170 and back to the cathode 110 to support further ionization at the cathode 110. The electrochemical reaction may also generate by-products such as, e.g., water and carbon dioxide at the anode 130. The hydrogen-containing fuel 160 may include, consist essentially of, or consist of, for example, hydrogen gas and/or a hydrocarbon fuel such as natural gas, propane, gasoline, diesel, or biofuel. In various embodiments, the hydrogen-containing fuel 160 may include, consist essentially of, or consist of a mixture of $H_2$, CO, $H_2O$, $CO_2$, and $CH_4$. For increased power generation, multiple SOFCs 100 may be linked together in a stacked structure. While FIG. 1 depicts SOFC 100 in a planar configuration, in various embodiments of the invention the SOFC may be arranged in a concentric tubular configuration. For example, the oxygen source 150 may be flowed through a tubular cathode 110, around which are disposed tubular electrolyte 120 and anode 130 (with a tubular functional layer 140 disposed between the cathode 110 and the solid electrolyte 120), while the hydrogen-containing fuel 160 may be flowed around the outside of the anode 130.

As detailed herein, the presence and use of the functional layer 140 within SOFC 100 may provide various beneficial effects enhancing the overall performance of SOFC 100. For example, the functional layer 140 may reduce interfacial resistance between the cathode 110 and the electrolyte 120. In various embodiments, the functional layer 140 has an oxygen exchange coefficient higher than that of the electrolyte 120 and/or the cathode 110, and therefore enhances oxygen transport within SOFC 100. As a result of faster oxygen transport and/or lower interfacial resistance, the functional layer 140 may also decrease the area-specific resistance of the SOFC 100. Functional layers 140 may also retard or block electronic conduction, as they may have ionic transference numbers higher than those for the electrolyte 120. In accordance with various embodiments of the invention, the functional layer 140 may have a thickness ranging from approximately 0.1 μm to approximately 20 μm, from approximately 1 μm to approximately 15 μm, or from approximately 1 μm to approximately 10 μm. In various embodiments, the thickness of the functional layer 140 is no greater than 20 μm, as thicker functional layers may exhibit deleteriously high ohmic resistance and thus limit the performance of SOFC 100. In various embodiments, the thickness of the functional layer 140 is no less than 0.1 μm, as thinner functional layers may not be fully continuous and may therefore not provide beneficial effects.

In accordance with embodiments of the invention, the presence of the functional layer 140 permits efficient operation of the SOFC 100 at lower-than-conventional temperatures. For example, SOFC 100 may be operated at temperatures below approximately 800° C., e.g., at temperatures ranging from approximately 400° C. to approximately 750° C. Moreover, the thickness of the functional layer 140 may be selected based on, at least in part, the desired operating temperature for the SOFC 100. For example, at relatively higher temperatures (e.g., ranging from approximately 550° C. to approximately 750° C.), the performance of the SOFC 100 may be limited by the open-circuit voltage, and thus relatively thicker functional layers 140 (for example, 5 μm or thicker, e.g., a thickness ranging from approximately 5 μm to approximately 20 μm, or ranging from approximately 5 μm to approximately 10 μm) may be utilized to enhance the open-circuit voltage and thus the overall performance of the SOFC 100. Alternatively, at relatively lower temperatures (e.g., ranging from approximately 400° C. to approximately 550° C.), the performance of the SOFC 100 may be limited by ohmic resistance (that is, although the presence of the functional layer 140 still reduces the interfacial resistance between the cathode 110 and the electrolyte 120, the ohmic resistance of the functional layer 140 itself may impact performance at lower temperatures), and thus relatively thinner functional layers 140 (for example, 5 μm or thinner, e.g., a thickness ranging from approximately 0.1 μm to approximately 5 μm, or ranging from approximately 1 μm to approximately 5 μm) may be utilized to minimize or reduce ohmic resistance and thus improve the overall performance of the SOFC 100.

In various embodiments of the invention, the cathode 110 includes, consists essentially of, or consists of, for example, one or more of lanthanum strontium cobalt ferrite (LSCF) (e.g., $La_{0.6}Sr_{0.4}Co_{0.8}Fe_{0.2}O_{3-\delta}$), lanthanum strontium manganite (LSM) (e.g., $La_{0.8}Sr_{0.2}MnO_{3-\delta}$), lanthanum strontium cobaltite (LSC) (e.g., $La_{0.6}Sr_{0.4}Co_{3-\delta}$), barium strontium cobalt ferrite (BCSF) (e.g., $Ba_{0.5}Sr_{0.5}CO_{0.8}Fe_{0.2}O_{3-\delta}$), samarium strontium cobaltite (SSC) (e.g., $Sm_{0.5}Sr_{0.5}CoO_{3-\delta}$), or doped ceria with dopant concentrations ranging from 5 to 30 mol % (or ranging from 10 to 20 mol %), for example samarium-doped ceria (SDC) (e.g., $Co$—$Ce_{0.8}Sm_{0.2}O_{1.9}$), gadolinium-doped ceria (GDC) (e.g., $Co$—$Ce_{0.9}Gd_{0.1}O_{1.95}$), or ceria doped with any one or more of Y, La, Pr, Sm, or Nd.

For example, the cathode 110 may include, consist essentially of, or consist of a mixture of SSC and GDC, e.g., in a ratio of 3:7 to 7:3 by mass. The cathode 110 may be both an ionic conductor and an electronic conductor, and the cathode 110 may be porous to promote oxygen access for ionization and to provide electrochemically active triple phase boundaries (TPBs) where the electrolyte 120 (or functional layer 140), air, and cathode 110 meet. For example, the cathode 110 may have a porosity ranging from approximately 30% to approximately 60%.

In general, the solid electrolyte 120 is a dense (e.g., ceramic) material that conducts oxygen ions while minimizing electronic conduction therewithin in order to prevent current leakage and corresponding electrical losses. The thickness of the solid electrolyte 120 may range from, for example, approximately 5 µm to approximately 40 µm, or even from approximately 10 µm to approximately 30 µm. In various embodiments of the invention, the solid electrolyte 120 includes, consists essentially of, or consists of, for example, one or more of yttria-stabilized zirconia (YSZ, e.g., $Y_{0.16}Zr_{0.84}O_{2-x}$), scandia-stabilized zirconia (ScSZ, e.g., $Sc_{0.2}Ce_{0.01}Zr_{0.79}O_{2-x}$), lanthanum strontium magnesium gallate (LSGM, e.g., $La_{0.8}Sr_{0.2}Ga_{0.8}Mg_{0.2}O_{3-x}$, $La_{0.9}Sr_{0.1}Ga_{0.8}Mg_{0.2}O_{3-x}$, or $La_{0.8}Sr_{0.2}Ga_{0.83}Mg_{0.17}O_{3-x}$), SDC, or GDC. Such solid electrolytes 120 may have dopant concentrations ranging from, for example, approximately 5 to approximately 30 mol %, or from approximately 10 to approximately 20 mol %. In various embodiments, the solid electrolyte 120 may include, consist essentially of, or consist of one or more doped cerias such as yttria-doped ceria (YDC, e.g., $Y_{0.1}Ce_{0.9}O_{1.95}$), neodymium-doped ceria (NdDC, e.g., $Nd_{0.1}Ce_{0.9}O_{1.95}$), praseodymium-doped ceria (PrDC, e.g., $Pr_{0.1}Ce_{0.9}O_{1.95}$), and/or lanthanum-doped ceria (LaDC, e.g., $La_{0.1}Ce_{0.9}O_{1.95}$). Such solid electrolytes 120 may have dopant concentrations ranging from, for example, approximately 5 to approximately 30 mol %, or from approximately 10 to approximately 20 mol %.

In various embodiments, the electrolyte 120 is composed of two or more layers having different compositions. In other embodiments, the electrolyte 120 may have a composition in which the concentration of one or more elements, dopants, or species varies along at least a portion of the thickness of electrolyte 120. For example, in an SOFC 100 in which the functional layer 140 contains a dopant such as Co, all or a portion of the electrolyte 120 may also contain the dopant, but at a concentration different from (e.g., less than) that at which it is present within the functional layer 140. For example, the electrolyte 120 may have a first layer, adjacent to the functional layer 140, which contains a first concentration of the dopant, where the first concentration is less than the concentration of the dopant within the functional layer 140. The electrolyte 120 may also have a second layer, adjacent to the first layer and/or to the anode 130, which contains the dopant at a second concentration less than the first concentration (and the second concentration may even be approximately zero). Similarly, all or a portion of the thickness of the electrolyte 120 (e.g., a portion of the electrolyte 120 adjacent to the functional layer 140, or even the entire electrolyte 120) may have a varying (e.g., graded) composition of the dopant that decreases as a function of distance away from the functional layer 140. Such compositional profiles may resist interdiffusion within the various layers of the SOFC 100, thereby maintaining high SOFC performance.

Like the cathode 110, the anode 130 is preferably a porous conductor of both ions and electrons in order to promote the electrochemical reaction. In various embodiments of the invention, the anode 130 includes, consists essentially of, or consists of, for example, a composite containing a nickel oxide and one or more oxide materials (e.g., one or more materials present within electrolyte 120, although such materials need not be preset in electrolyte 120). Other oxide materials present within anodes 130 in accordance with embodiments of the invention may include yttria-stabilized zirconia (YSZ) ranging in yttria content from 3 to 8 mol %, a doped ceria-based material, and/or a specific doped ceria material found in the solid electrolyte 120 (e.g., GDC). For example, the anode 130 may include, consist essentially of, or consist of a cermet of nickel oxide and yttria-stabilized zirconia. In such a cermet the nickel oxide to yttria-stabilized zirconia ratio may range from, for example, approximately 1:2 to 3:1 by weight. In another example, the anode 130 may include, consist essentially of, or consist of a cermet of nickel oxide and GDC. In other embodiments, the anode 130 may include, consist essentially of, or consist of a ceramic oxide material containing strontium, iron, cobalt, and molybdenum (i.e., SCFM), for example $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$.

In various embodiments, the SOFC 100 may include an anode functional layer (not depicted in FIG. 1) disposed between the anode 130 and the electrolyte 120. The anode functional layer may be, for example, a mixture of the anode material and a ceria-based electrolyte. For example, the anode functional layer may include, consist essentially of, or consist of a cermet of nickel oxide and GDC. In such a cermet the nickel oxide to GDC ratio may range from, for example, approximately 1:2 to 3:1 by weight. In another example, the anode functional layer may include, consist essentially of, or consist of a ceramic oxide material containing strontium, iron, cobalt, and molybdenum (i.e., SCFM), for example $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$, and GDC. In such a cermet the SCFM to GDC ratio may range from, for example, approximately 1:2 to 3:1 by weight. In various embodiments, the thickness of the anode functional layer may range from approximately 5 µm to approximately 50 µm, or from approximately 10 µm to approximately 25 µm.

In accordance with various embodiments of the present invention, the functional layer 140 is disposed at the interface between the cathode 110 and the solid electrolyte 120 and reduces the interfacial resistance (e.g., to ionic conduction) therebetween. In various embodiments, the functional layer 140 includes, consists essentially of, or consists of a ceramic material doped with one or more metals (e.g., cobalt). The functional layer 140 may contain cobalt and/or one or more other metals in the range of, for example, 0.1 mol % to 10 mol % of the ceramic material. In various embodiments, the cobalt and/or other metal concentration ranges from 0.5 mol % to 5 mol % of the ceramic material. In various embodiments, the ceramic material of the functional layer 140 is one or more materials of the cathode 110 and/or of the solid electrolyte 120. For example, the functional layer 140 may include, consist essentially of, or consist of cobalt-doped GDC and/or cobalt-doped SDC. In addition, the doped ceria composition in the functional layer 140 may have a different dopant than the electrolyte. For example, the functional layer 140 may include, consist essentially of, or consist of cobalt-doped SDC while the electrolyte may include, consist essentially of, or consist of GDC.

Various techniques may be utilized for the fabrication of the SOFC 100 and its constituent layers in accordance with embodiments of the present invention. For example, the anode 130 and/or the solid electrolyte 120 may be fabricated by tape casting of the individual layers. In various embodiments, the anode 130 and solid electrolyte 120 are laminated together by, for example, hot isostatic pressing, before application of the functional layer 140. The functional layer 140 and/or the cathode 110 may be applied as a suspension or paste (e.g., mixed with one or more liquid agents) via, e.g., drop coating, spin coating, spray coating, blade coating, or screen printing. In addition, the functional layer 140 may be deposited by physical deposition (PVD) techniques including sputtering, evaporation, and pulsed laser deposition (PLD). Such techniques may be advantageous for the formation of thin layers having thicknesses less than 5 µm, or even less than 1 µm. In various embodiments, the functional layer 140 and the cathode 110 layer are co-fired, i.e., subjected together to a single annealing step. In a co-fired process the functional layer 140 is first deposited on the SOFC 100, followed by deposition of the cathode 110 on the functional layer 140. Then, the SOFC 100 with both layers is co-fired, annealing both layers with the same thermal exposure. For example, the SOFC 100 may be annealed at a temperature ranging from approximately 800° C. to approximately 1100° C. and/or for a time period ranging from approximately 0.5 hour to approximately 5 hours.

Alternatively, the functional layer 140 may be applied and then annealed for sintering before application of the cathode 110. In such as process the functional layer 140 and the cathode 110 may be fired in separate annealing steps to allow optimization of the materials parameters of the individual layers, or for other production considerations such as minimization of contamination. After application of the functional layer 140, the partial SOFC 100 (i.e., without the cathode 110) may be annealed. For example, the partial SOFC 100 may be annealed at a temperature ranging from approximately 800° C. to approximately 1100° C. and/or for a time period ranging from approximately 0.5 hour to approximately 5 hours. Then, after application of the cathode 110, the entire SOFC 100 may be annealed. For example, the SOFC 100 may be annealed at a temperature ranging from approximately 800° C. to approximately 1100° C. and/or for a time period ranging from approximately 0.5 hour to approximately 5 hours.

Various functional layers 140 in accordance with embodiments of the invention contain species such as Co that may act as sintering agents, thereby enabling the use of sintering anneals at lower temperatures and/or for shorter times. For example, Co-containing functional layers 140 may be sintered at temperatures of approximately 950° C. or below, or even 900° C. or below, while still achieving sufficient layer density to enable high performance of SOFC 100.

EXAMPLES

In order to evaluate the effect of the functional layer 140 on cathode performance, a functional layer 140 composed of cobalt-doped GDC was prepared by solid-state synthesis. Specifically, GDC ($Ce_{0.9}Gd_{0.1}O_{1.95}$) and cobalt oxide ($Co_3O_4$) (here 2 mol %; embodiments of the invention may utilize, e.g., approximately 0.1 mol % to approximately 10 mol %) were mixed and ball milled for a period of 24 hours. The resulting mixture was dried, heat treated at 700° C. for 2 hours, and then ball milled again for 24 hours to produce the cobalt-doped GDC.

Figure 2A:
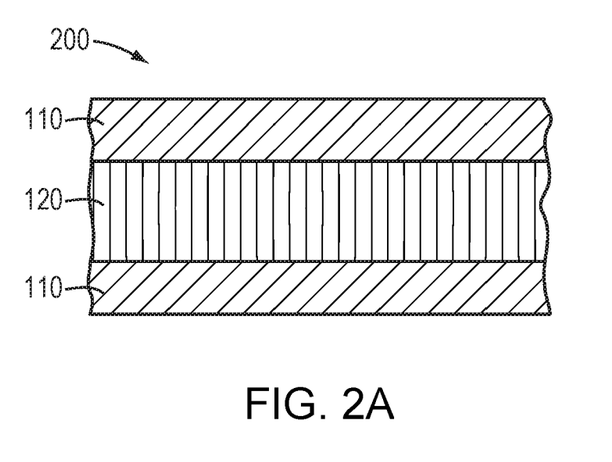
FIGS. 2A and 2B are schematic diagrams of test structures for the evaluation of cathode performance in accordance with various embodiments of the invention.
Figure 2B:
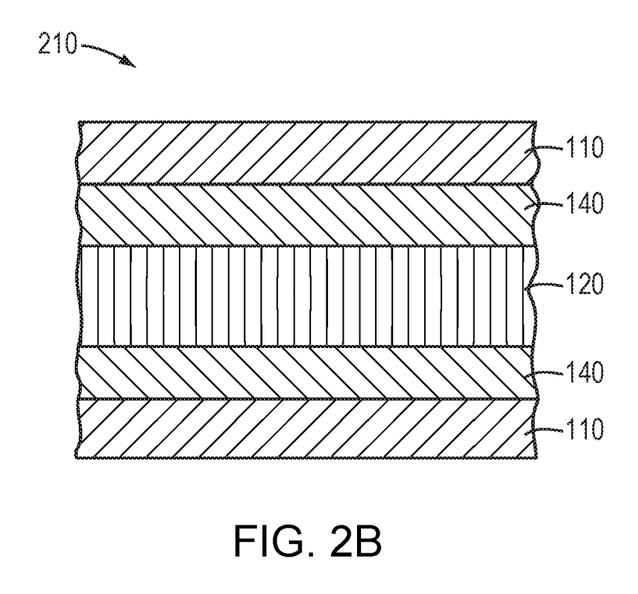

In order to study the effect of this functional layer 140 on cathode performance, symmetrical test structures were fabricated, as shown in FIGS. 2A and 2B. As shown, test structure 200 featured a cathode 110 on either side of a solid electrolyte 120. The test structure 210 was identical to test structure 200, but with the addition of the cobalt-doped GDC functional layer 140 between each of the cathodes 110 and the solid electrolyte 120. In this series of tests, GDC was utilized as the solid electrode 120, while a mixture of SSC ($Sm_{0.5}Sr_{0.5}CoO_{3-\delta}$) and GDC ($Ce_{0.9}Gd_{0.1}O_{1.95}$) (SSC-GDC) in a ratio of 7:3 by mass or LSCF ($La_{0.6}Sr_{0.4}Co_{0.8}Fe_{0.2}O_{3-\delta}$) and GDC ($Ce_{0.9}Gd_{0.1}O_{1.95}$) in a ratio of 1:1 by mass (LSCF-GDC) was utilized for the cathodes 110. Once the functional layers 140 and the cathodes 110 were applied to the electrolytes 120 in the test structures 200, 210, the structures were co-fired at temperatures ranging from 800° C. to 1100° C. for a period of 2 hours.

Figure 3:
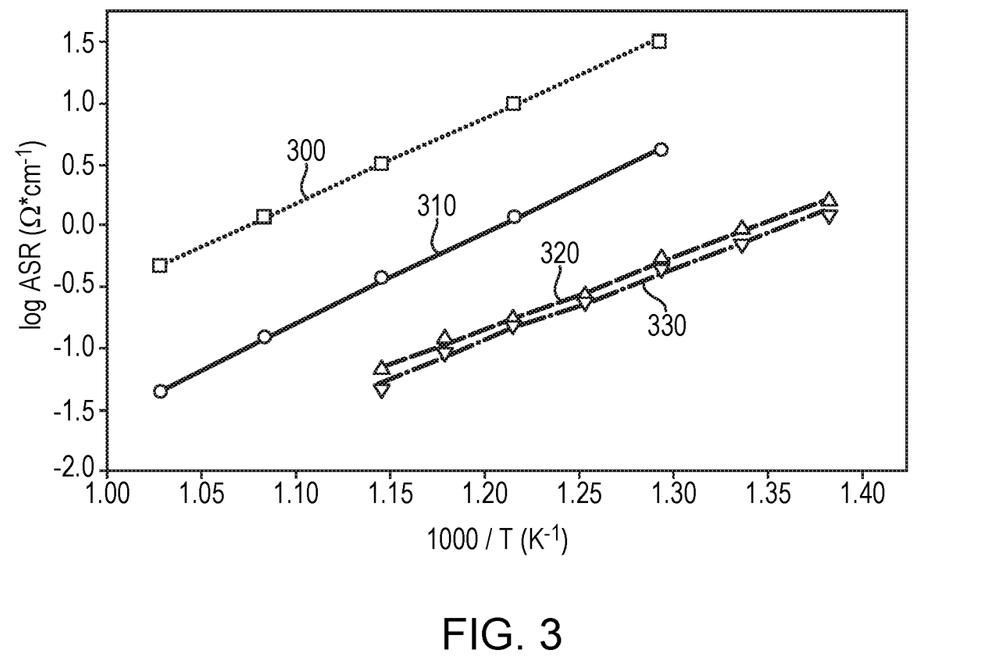
FIG. 3 is a graph of area specific resistance for various cathode test structures in accordance with various embodiments of the invention.

FIG. 3 is a graph of the area specific resistance (ASR) of the cathode 110 for various test structures 200, 210 as a function of operating temperature. Curve 300 represents test structure 200 (i.e., without the functional layer 140) utilizing LSCF-GDC as the cathode 110 after co-firing at a temperature of 1100° C. Curve 310 represents test structure 200 (i.e., without the functional layer 140) utilizing SSC-GDC as the cathode 110 after co-firing at a temperature of 950° C. Curve 320 represents test structure 210 (i.e., with the functional layer 140) utilizing SSC-GDC as the cathode 110 after co-firing at a temperature of 900° C. Curve 330 represents test structure 210 (i.e., with the functional layer 140) utilizing SSC-GDC as the cathode 110 after co-firing at a temperature of 950° C. As shown, the ASR of the test structures 210 is much improved when compared to the performance of the test structures 200 over the entire range of operating temperatures studied. In addition, the presence of the functional layer 140 within the test structures 210 decreased cathode polarization by approximately one order of magnitude (10×) and decreased the activation energy significantly.

Performance of full SOFCs incorporating the cobalt-doped GDC functional layer 140 was also investigated. In the SOFCs, the anode was a mixture of nickel oxide and GDC (Ni-GDC) in a ratio of 2:3 by mass, the electrolyte was GDC 20 µm thick, and the cathode was SSC-GDC in a ratio of 7:3 by mass. These compositions and thicknesses are only exemplary; in various embodiments, the anode may include, consist essentially of, or consist of a cermet of nickel oxide and yttria-stabilized zirconia. In such a cermet the nickel oxide to yttria-stabilized zirconia ratio may range from, for example, approximately 1:2 to 3:1 by weight. The anode and electrolyte layers were fabricated via tape casting and then laminated together using a hot press. The resulting anode/electrolyte assemblies were annealed at 1450° C. for a time period of 4 hours. The functional layer was deposited on the sintered half-cell by drop coating to a thickness ranging from 1 µm to 10 µm. The SSC-GDC cathode material was applied directly to the functional layer, and the resulting assemblies were co-fired at 950° C. for a time period of 2 hours. In addition, control SOFCs lacking the cobalt-doped GDC functional layer were similarly fabricated for comparative purposes. The various SOFCs were evaluated at a range of temperatures utilizing humidified hydrogen gas as fuel.

Figure 4:
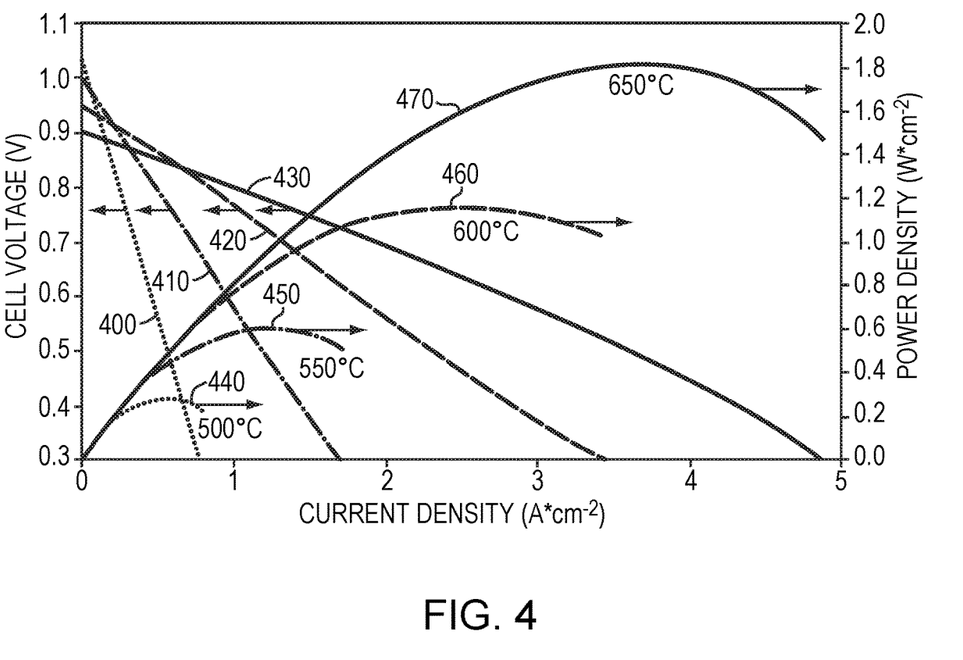
FIG. 4 is a graph of cell performance at various operating temperatures for a cell incorporating a 6 μm thick functional layer in accordance with various embodiments of the invention.

FIG. 4 is a graph of SOFC performance at temperatures ranging from 500° C. to 650° C. for a SOFC incorporating a cobalt-doped GDC functional layer having a thickness of 6 μm. Curves 400, 410, 420, 430 indicate the cell voltage (in volts) as a function of current density (in amps/cm$^2$) for operating temperatures of 500° C., 550° C., 600° C., and 650° C. respectively. Curves 440, 450, 460, 470 indicate the power density (in watts/cm$^2$) as a function of current density (in amps/cm$^2$) for operating temperatures of 500° C., 550° C., 600° C., and 650° C. respectively.

Figure 5:
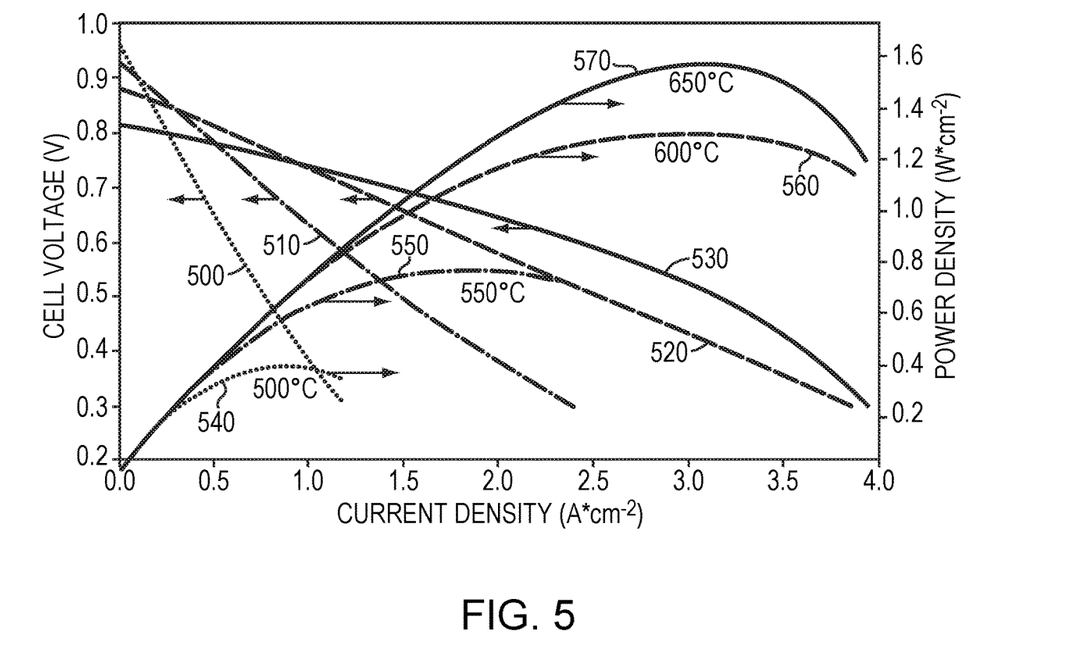
FIG. 5 is a graph of cell performance at various operating temperatures for a cell incorporating a 1 μm thick functional layer in accordance with various embodiments of the invention.

FIG. 5 is a graph of SOFC performance at temperatures ranging from 500° C. to 650° C. for a SOFC incorporating a cobalt-doped GDC functional layer having a thickness of 1 μm. Curves 500, 510, 520, 530 indicate the cell voltage (in volts) as a function of current density (in amps/cm$^2$) for operating temperatures of 500° C., 550° C., 600° C., and 650° C. respectively. Curves 540, 550, 560, 570 indicate the power density (in watts/cm$^2$) as a function of current density (in amps/cm$^2$) for operating temperatures of 500° C., 550° C., 600° C., and 650° C. respectively.

Figure 6:
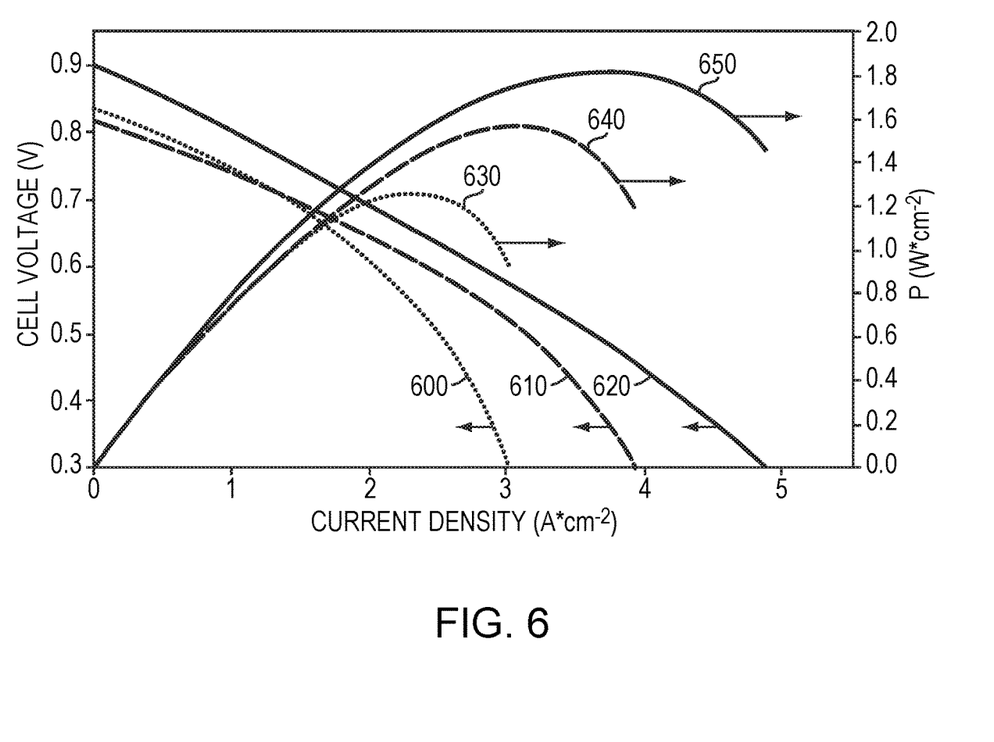
FIG. 6 is a graph of cell performance at an operating temperature of 650° C. for fuel cells with functional layers of various thicknesses in accordance with various embodiments of the invention.

FIG. 6 is a graph of SOFC performance as a function of cobalt-doped GDC functional layer thickness at an operating temperature of 650° C. Curves 600, 610, 620 indicate the cell voltage (in volts) as a function of current density (in amps/cm$^2$) for SOFCs having no functional layer (i.e., a functional layer thickness of zero) and having functional layers of thicknesses 1 μm and 6 μm, respectively. Curves 630, 640, 650 indicate the power density (in watts/cm$^2$) as a function of current density (in amps/cm$^2$) for SOFCs having no functional layer and having functional layers of thicknesses 1 μm and 6 μm, respectively.

Figure 7:
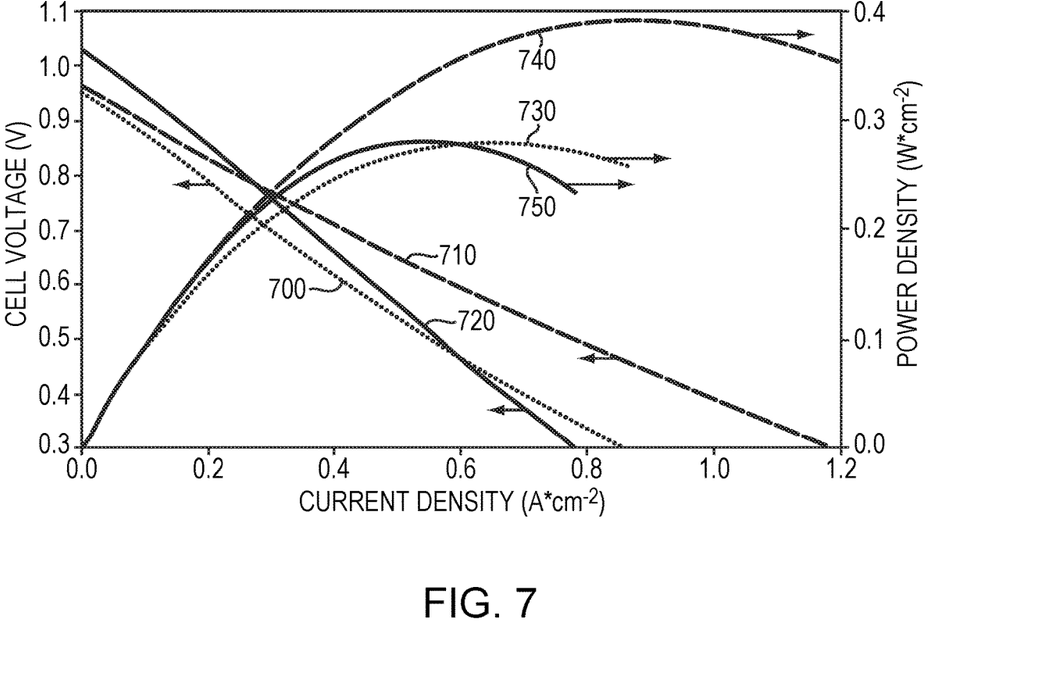
FIG. 7 is a graph of cell performance at an operating temperature of 500° C. for fuel cells with functional layers of various thicknesses in accordance with various embodiments of the invention.

FIG. 7 is a graph of SOFC performance as a function of cobalt-doped GDC functional layer thickness at an operating temperature of 500° C. Curves 700, 710, 720 indicate the cell voltage (in volts) as a function of current density (in amps/cm$^2$) for SOFCs having no functional layer and having functional layers of thicknesses 1 μm and 6 μm, respectively. Curves 730, 740, 750 indicate the power density (in watts/cm$^2$) as a function of current density (in amps/cm$^2$) for SOFCs having no functional layer and having functional layers of thicknesses 1 μm and 6 μm, respectively.

As shown in FIGS. 4-7, the use of a functional layer 140 in accordance with embodiments of the present invention can improve performance of an SOFC dramatically. For example, as shown in FIGS. 4 and 6, the SOFC having the 6 μm thick functional layer exhibits an output power density of 1.8 W/cm$^2$ at an operating temperature of 650° C., dramatically higher than the performance of the SOFC without the functional layer. The thicker functional layer, which improves open circuit voltage, performs better within this regime in which performance is limited by open circuit voltage. Moreover, as shown in FIGS. 5 and 7, at lower operating temperatures (500° C.-600° C.), the SOFC having the 1 μm thick functional layer exhibits superior performance primarily due to the reduced ohmic resistance within the layer, even though the open circuit voltage is not greatly improved. Thus, functional layers in accordance with embodiments of the invention may have their thicknesses selected based on, at least in part, the intended operating temperature of the SOFC. Since the functional layer may improve performance via improvements in open circuit voltage and/or ohmic resistance, functional layers of various thicknesses may be utilized to improve SOFC performance over a range of different operating conditions.

Figure 8:
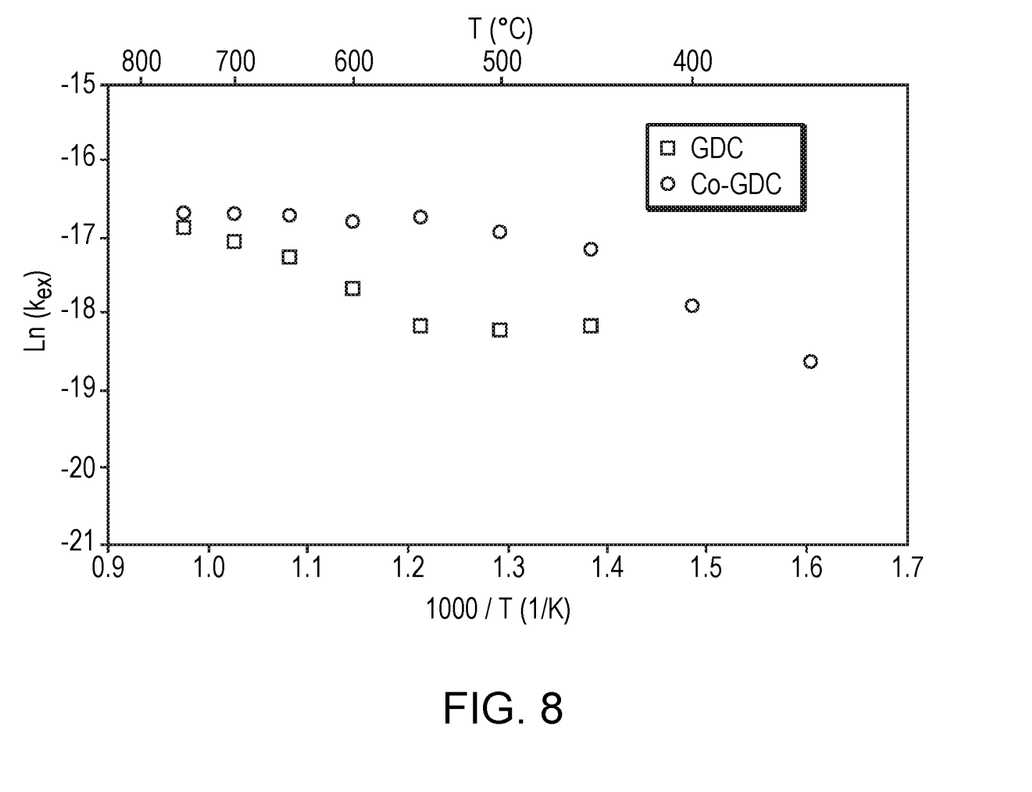
FIG. 8 is a graph of oxygen surface exchange coefficients of two exemplary materials in accordance with various embodiments of the invention.

FIG. 8 is a graph of oxygen surface exchange coefficients of an exemplary functional layer material (Co-GDC) and an exemplary electrolyte material (GDC). Here, the Co-GDC layer contains 2 mol % Co, and, as shown, the Co-GDC layer exhibits a higher oxygen surface exchange coefficient over the entire temperature range of approximately 400° C. to approximately 750° C. In various embodiments, this higher oxygen surface exchange coefficient is due at least in part to agglomeration or enrichment of the Co at grain boundaries within the GDC. The higher oxygen surface exchange coefficient of the functional layer enhances mass transport at the interface between cathode and electrolyte, reducing interfacial resistance to oxygen introduction in the electrolyte, increasing cell performance, and decreasing ASR. Moreover, the use of such functional layers in accordance with embodiments of the invention enables enhanced SOFC performance at lower temperatures, for example between approximately 400° C. and approximately 750° C.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A solid oxide fuel cell comprising:
 a cathode;
 a solid electrolyte for conducting oxygen ions from the cathode to an anode;
 an anode for reacting oxygen ions from the solid electrolyte with a hydrogen-containing fuel; and
 a functional layer disposed between the cathode and the solid electrolyte,
 wherein the solid electrolyte consists of at least one of samarium-doped ceria, gadolinium-doped ceria, yttria-doped ceria, neodymium-doped ceria, praseodymium-doped ceria, or lanthanum-doped ceria.

2. The solid oxide fuel cell of claim 1, wherein the functional layer comprises at least one of cobalt-doped gadolinium-doped ceria or cobalt-doped samarium-doped ceria.

3. The solid oxide fuel cell of claim 1, wherein the cathode comprises at least one of lanthanum strontium cobalt ferrite, lanthanum strontium manganite, lanthanum strontium cobaltite, barium strontium cobalt ferrite, samarium strontium cobaltite, samarium-doped ceria, or gadolinium-doped ceria.

4. The solid oxide fuel cell of claim 1, wherein the anode comprises a composite comprising nickel and yttria-stabilized zirconia.

5. The solid oxide fuel cell of claim 1, wherein a thickness of the functional layer ranges from approximately 1 μm to approximately 10 μm.

6. The solid oxide fuel cell of claim 1, wherein the functional layer contains cobalt at a composition ranging from approximately 0.5 mol % to 5 mol %.

7. A method of electrochemically converting a hydrogen-containing fuel to electricity, at an operating temperature, using a solid oxide fuel cell comprising (i) a cathode, (ii) an anode, (iii) a solid electrolyte disposed between the anode and the cathode, and (iv) a functional layer disposed between the cathode and the solid electrolyte, wherein a thickness of the functional layer is selected from the range of 0.1 μm to 20 μm, the method comprising:

selecting as the operating temperature a temperature less than 550° C. and greater than 400° C. when the thickness of the functional layer is less than 5 μm;

selecting as the operating temperature a temperature greater than 550° C. when the thickness of the functional layer is greater than 5 μm;

ionizing oxygen at the cathode, thereby producing oxygen ions;

conducting the oxygen ions from the cathode to the anode; and reacting the oxygen ions with the fuel at the anode at the operating temperature, thereby generating electricity, wherein the solid electrolyte consists of at least one of samarium-doped ceria, gadolinium-doped ceria, yttria-doped ceria, neodymium-doped ceria, praseodymium-doped ceria, or lanthanum-doped ceria.

8. The method of claim 7, wherein (i) the thickness of the functional layer is greater than 5 μm, and (ii) the operating temperature is less than 750° C.

9. The method of claim 7, wherein the functional layer comprises at least one of cobalt-doped gadolinium-doped ceria or cobalt-doped samarium-doped ceria.

10. The method of claim 7, wherein the functional layer contains cobalt at a composition ranging from approximately 0.5 mol % to 5 mol %.

11. The method of claim 7, wherein the solid electrolyte comprises at least one of samarium-doped ceria, gadolinium-doped ceria, yttria-doped ceria, neodymium-doped ceria, praseodymium-doped ceria, or lanthanum-doped ceria.

12. A method of fabricating a solid oxide fuel cell, the method comprising:

providing an anode layer;

disposing a solid electrolyte layer over the anode layer;

selecting a thickness of a functional layer based at least in part on an intended temperature of operation of the solid oxide fuel cell;

depositing the functional layer over the solid electrolyte layer; and disposing a cathode layer over the functional layer, thereby forming the solid oxide fuel cell, wherein the solid electrolyte comprises at least one of samarium-doped ceria, gadolinium-doped ceria, yttria-doped ceria, neodymium-doped ceria, praseodymium-doped ceria, or lanthanum-doped ceria.

13. The method of claim 12, wherein the thickness of the functional layer is selected as 5 μm or less when the intended temperature of operation is less than 550° C.

14. The method of claim 12, wherein the thickness of the functional layer is selected as 5 μm or greater when the intended temperature of operation is greater than 550° C.

15. The method of claim 12, wherein the functional layer comprises at least one of cobalt-doped gadolinium-doped ceria or cobalt-doped samarium-doped ceria.

16. The method of claim 12, wherein a thickness of the functional layer ranges from approximately 1 μm to approximately 10 μm.

17. The method of claim 12, wherein the functional layer contains cobalt at a composition ranging from approximately 0.5 mol % to 5 mol %.

18. The solid oxide fuel cell of claim 1, wherein the solid electrolyte consists of at least one of neodymium-doped ceria, praseodymium-doped ceria, or lanthanum-doped ceria.

19. The method of claim 12, wherein (i) the thickness of the functional layer is selected as 5 μm or less when the intended temperature of operation is less than 550° C., and (ii) the thickness of the functional layer is selected as 5 μm or greater when the intended temperature of operation is greater than 550° C.

20. The method of claim 12, wherein the solid electrolyte consists of at least one of samarium-doped ceria, gadolinium-doped ceria, yttria-doped ceria, neodymium-doped ceria, praseodymium-doped ceria, or lanthanum-doped ceria.

21. The method of claim 12, wherein the solid electrolyte comprises at least one of neodymium-doped ceria, praseodymium-doped ceria, or lanthanum-doped ceria.

22. The method of claim 12, wherein the solid electrolyte consists of at least one of neodymium-doped ceria, praseodymium-doped ceria, or lanthanum-doped ceria.

23. The method of claim 7, wherein the solid electrolyte consists of at least one of neodymium-doped ceria, praseodymium-doped ceria, or lanthanum-doped ceria.

24. The method of claim 10, wherein at least a portion of the solid electrolyte does not contain cobalt.

25. The method of claim 17, wherein at least a portion of the solid electrolyte does not contain cobalt.

26. The method of claim 7, wherein a composition of the functional layer is different from a composition of the solid electrolyte.

27. The method of claim 12, wherein a composition of the functional layer is different from a composition of the solid electrolyte.

28. The method of claim 27, wherein the composition of the functional layer is different from a composition of the anode layer.

29. The method of claim 12, wherein a composition of the functional layer is different from a composition of the anode layer.

* * * * *